(12) United States Patent
Sargent

(10) Patent No.: US 10,856,687 B1
(45) Date of Patent: Dec. 8, 2020

(54) SLOW COOKER WITH HEATING AND COOLING FUNCTION

(71) Applicant: Todd Sargent, Albion, NY (US)

(72) Inventor: Todd Sargent, Albion, NY (US)

(*) Notice: Subject to any disclaimer, the term of this patent is extended or adjusted under 35 U.S.C. 154(b) by 247 days.

(21) Appl. No.: 15/990,909

(22) Filed: May 29, 2018

(51) Int. Cl.
*A47J 27/00* (2006.01)
*A47J 36/00* (2006.01)
*A47J 36/16* (2006.01)
*F25D 23/12* (2006.01)
*F25D 31/00* (2006.01)

(52) U.S. Cl.
CPC ............ *A47J 27/004* (2013.01); *F25D 23/12* (2013.01); *F25D 31/005* (2013.01); *F25D 2700/12* (2013.01)

(58) Field of Classification Search
None
See application file for complete search history.

(56) References Cited

U.S. PATENT DOCUMENTS

| 4,884,626 | A | 12/1989 | Filpowski | |
|---|---|---|---|---|
| 5,951,900 | A * | 9/1999 | Smrke | F24C 15/106 219/497 |
| D420,246 | S | 2/2000 | Alonge | |
| 6,279,464 | B1 | 8/2001 | Chen et al. | |
| 6,283,014 | B1 * | 9/2001 | Ng | A47J 27/0802 219/431 |
| 6,573,483 | B1 * | 6/2003 | DeCobert | A47J 36/32 219/506 |
| 7,117,937 | B2 | 10/2006 | Clark | |
| 7,174,720 | B2 * | 2/2007 | Kennedy | A47J 27/004 62/3.3 |
| 7,706,671 | B2 * | 4/2010 | Brown | A47J 27/62 219/238 |
| 7,872,214 | B2 | 1/2011 | Schandel | |
| 9,664,422 | B2 | 5/2017 | Godecker | |
| 2013/0264333 | A1 * | 10/2013 | Alipour | H05B 6/12 219/621 |
| 2016/0007644 | A1 * | 1/2016 | Hack | A23L 3/003 99/333 |
| 2016/0123660 | A1 * | 5/2016 | Peng | A47J 27/004 219/623 |
| 2019/0269272 | A1 * | 9/2019 | Itzkowitz | A47J 36/321 |

FOREIGN PATENT DOCUMENTS

| JP | 2006102204 | A | * | 4/2006 | |
| WO | 2005079364 | | | 2/2007 | |
| WO | WO-2019091169 | A1 | * | 5/2019 | A47J 27/09 |

* cited by examiner

*Primary Examiner* — Joseph M. Pelham

(57) ABSTRACT

The slow cooker with heating and cooling functions comprises a base with both heating and cooling functions, a crock, and a lid. Food may be placed into the crock and covered with the lid. The crock may then be placed into the base, which may be programmed to heat and/or cool the food in the crock. The base further comprises a controller that determines when, how long, and to what extent the heat or cooling should be applied to the crock. The controller may display operational status and accept operational input from a touch sensitive display on the front of the base. The controller may communicate wirelessly with a smart device so that operational status and operational input that are accessible on the front of the base may be accessed from the smart device.

15 Claims, 5 Drawing Sheets

SLOW COOKER WITH HEATING AND COOLING FUNCTION

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of cooking appliances, more specifically, a slow cooker with heating and cooling functions.

SUMMARY OF INVENTION

The slow cooker with heating and cooling functions comprises a base with both heating and cooling functions, a crock, and a lid. Food may be placed into the crock and covered with the lid. The crock may then be placed into the base, which may be programmed to heat and/or cool the food in the crock. The base further comprises a controller that determines when, how long, and to what extent the heat or cooling should be applied to the crock. The controller may display operational status and accept operational input from a touch sensitive display on the front of the base. The controller may communicate wirelessly with a smart device so that operational status and operational input that are accessible on the front of the base may be accessed from the smart device.

An object of the invention is to provide a slow cooker for heating food.

Another object of the invention is to provide a cooling function for the slow cooker so that food may be refrigerated prior to heating.

A further object of the invention is to provide a controller that presents operational status and accepts operational input that control the operation of the slow cooker Yet another object of the invention is to provide a wireless link between the controller and an application program running on a smart device so that features of the front panel of the slow cooker are accessible remotely.

These together with additional objects, features and advantages of the slow cooker with heating and cooling functions will be readily apparent to those of ordinary skill in the art upon reading the following detailed description of the presently preferred, but nonetheless illustrative, embodiments when taken in conjunction with the accompanying drawings.

In this respect, before explaining the current embodiments of the slow cooker with heating and cooling functions in detail, it is to be understood that the slow cooker with heating and cooling functions is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the slow cooker with heating and cooling functions.

It is therefore important that the claims be regarded as including such equivalent construction insofar as they do not depart from the spirit and scope of the slow cooker with heating and cooling functions. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
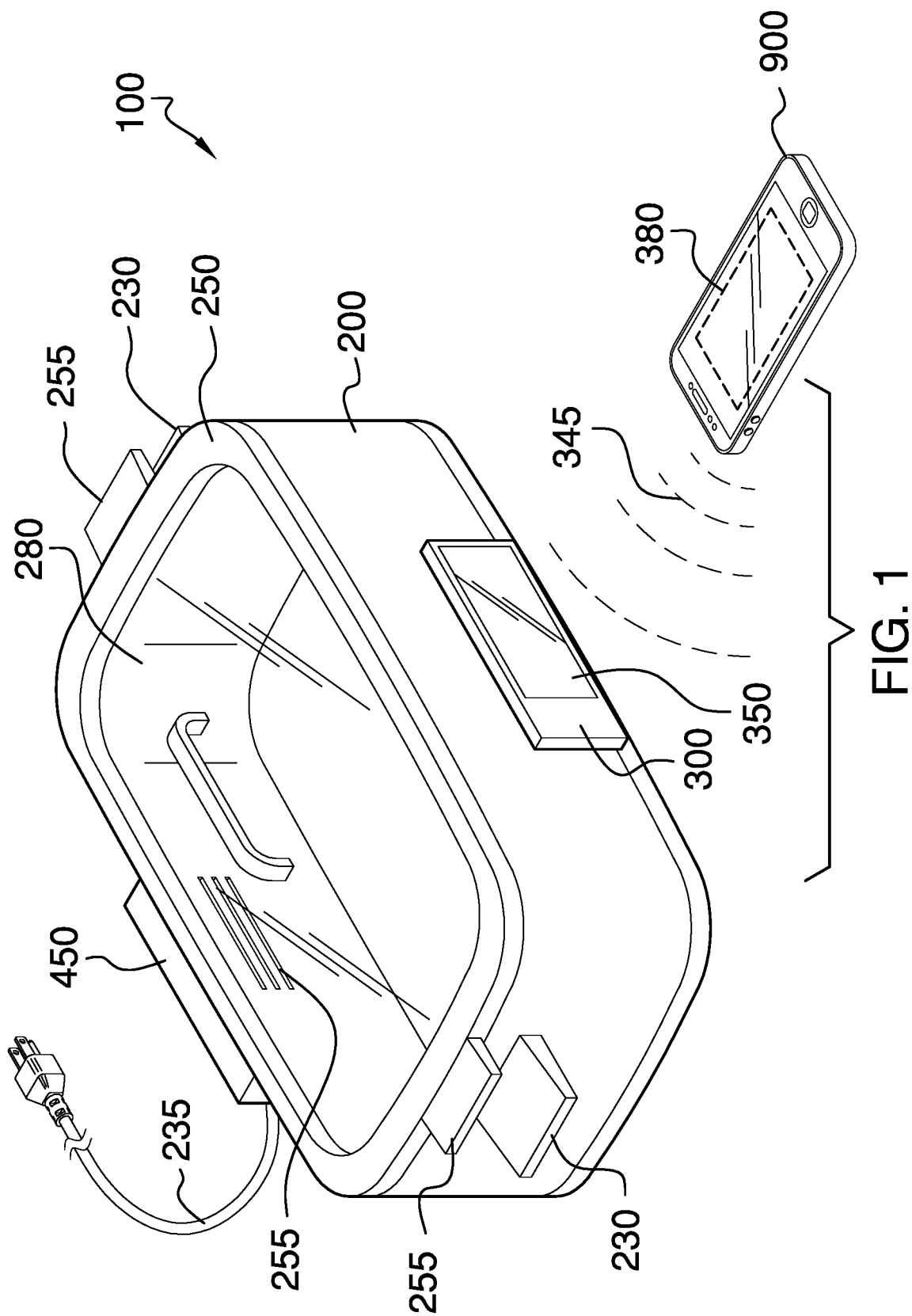
FIG. 1 is a perspective view of an embodiment of the disclosure.
Figure 2:
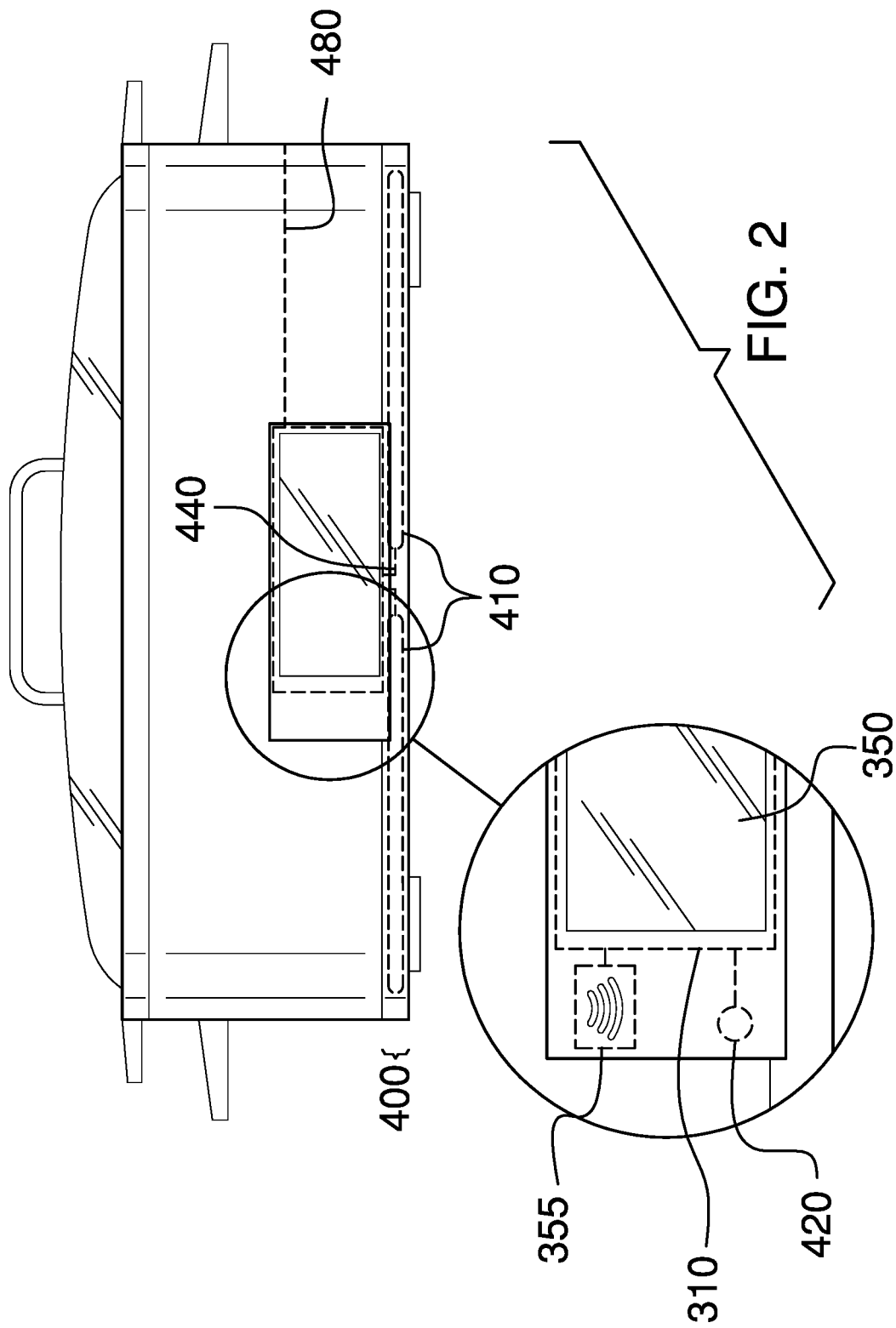
FIG. 2 is a front view of an embodiment of the disclosure.
Figure 3:
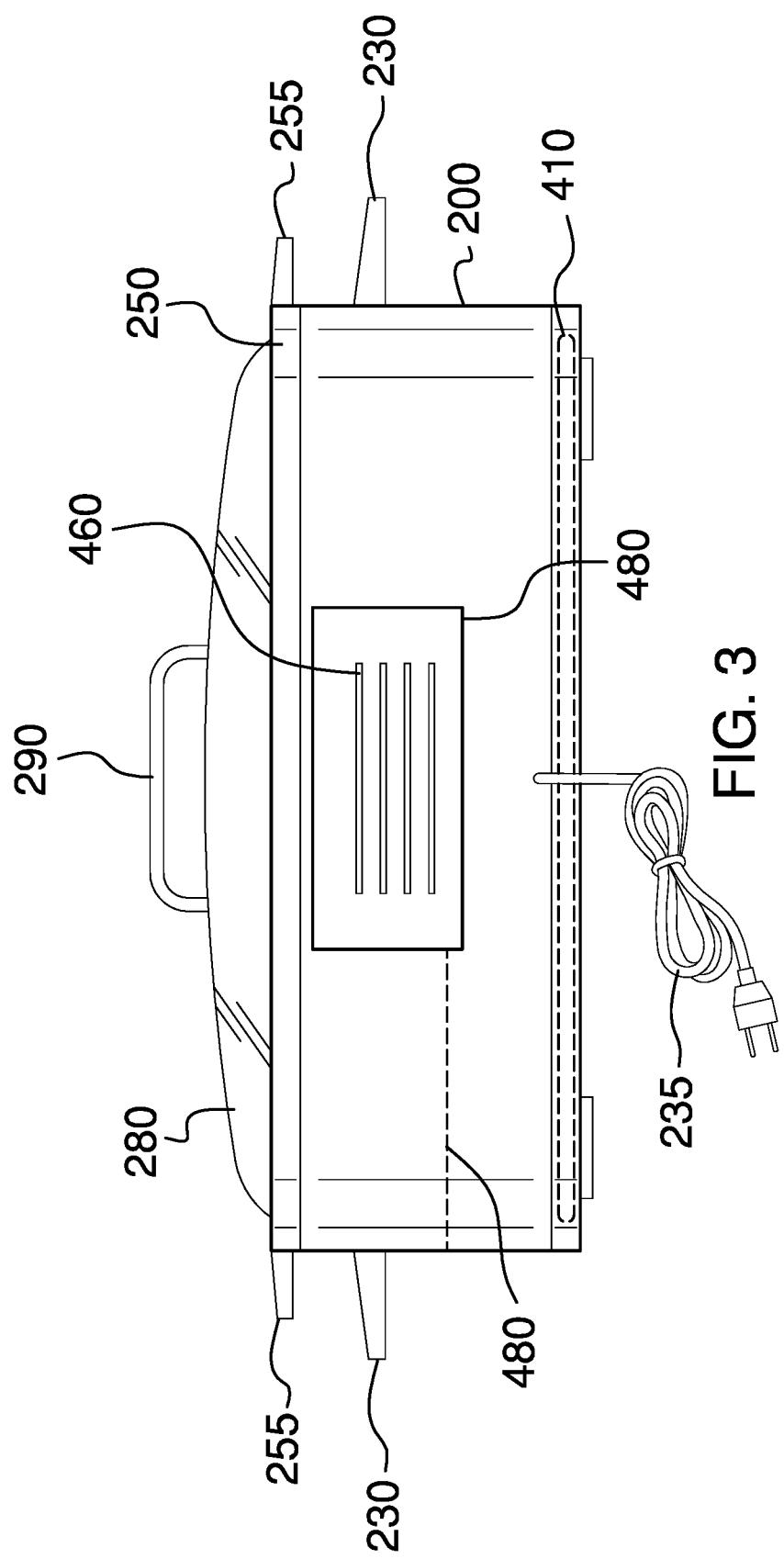
FIG. 3 is a rear view of an embodiment of the disclosure.
Figure 4:
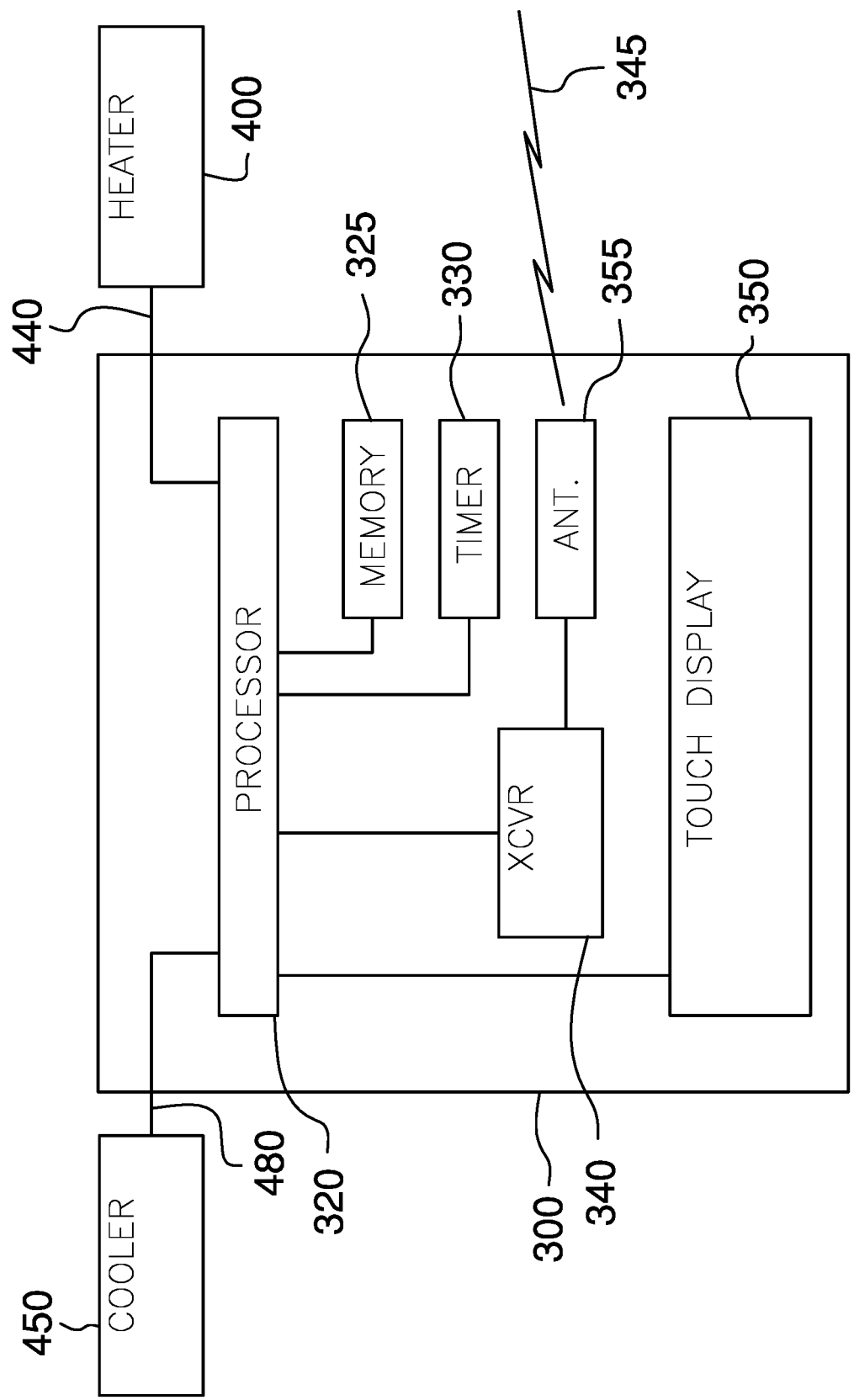
FIG. 4 is a block diagram of an embodiment of the disclosure illustrating functional blocks of the controller.
Figure 5:
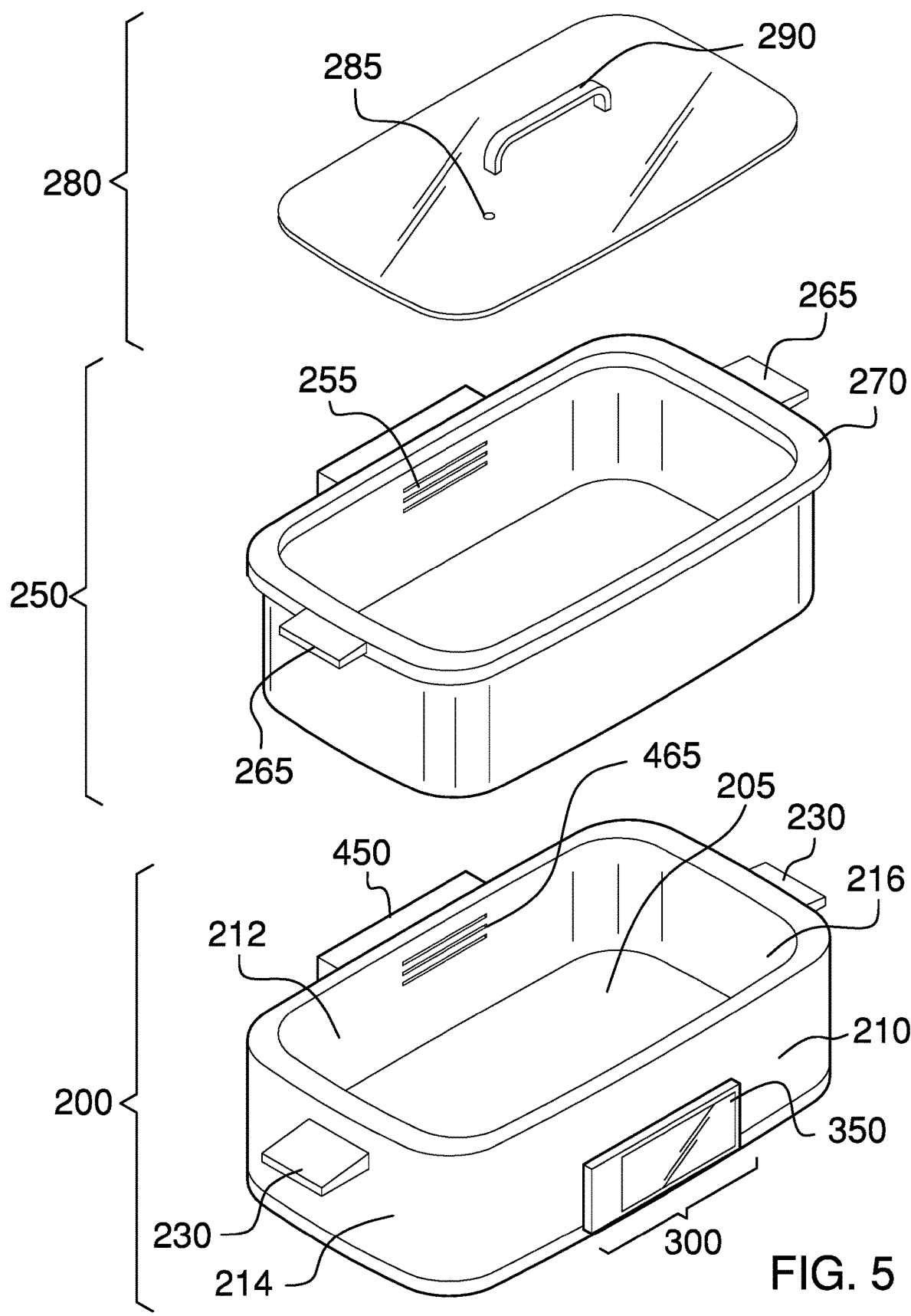
FIG. 5 is an exploded view of an embodiment of the disclosure illustrating the base, crock, and lid.

Detailed reference will now be made to a first potential embodiment of the disclosure, which is illustrated in FIGS. 1 through 5.

The slow cooker with heating and cooling functions 100 (hereinafter invention) comprises a base 200, a heater 400, a cooler 450, a controller 300, a crock 250, and a lid 280. The invention 100 is a cooking appliance that may keep food chilled using the cooler 450 prior to cooking the food using the heater 400.

The base 200 may be a holder for the crock 250 and an enclosure for the heater 400 and the cooler 450. The base 200 may comprise a front wall 210, a left side wall 214, a rear wall 212, and a right side wall 216 that are coupled to each other and to a bottom 205 to form an open-top receptacle that the crock 250 may be lowered into. The base 200 may be made of a rigid, heat resistant material such that heating or cooling of the crock 250 does not affect a countertop.

The base 200 may comprise a power cord 235 that plugs into a wall outlet to power the invention 100.

The base 200 may comprise a pair of base handles 230 to aid in carrying the invention 100. The pair of base handles 230 may be coupled to the left side wall 214 and the right side wall 216.

The heater 400 comprises one or more heating elements 410 and one or more temperature sensors 420. The one or more heating elements 410 may produce heat when an electrical current is passed through the one or more heating elements 410. The one or more heating elements 410 may be controlled by the controller 300 via one or more heating control signals 440. The one or more temperature sensors 420 may monitor an actual temperature of the crock 250 and may report the actual temperature to the controller 300. The controller 300 may cycle power to the one or more heating elements 410 on and off to maintain the actual temperature at a predetermined cooking temperature.

The cooler 450 may produce chilled air when power is applied to the cooler 450. The cooler 450 may be controlled by the controller 300 via one or more cooling control signals 480. The cooler 450 may pull air in through a rear vent 460, chill the air, and blow the chilled air out of a front vent 465 located in the rear wall 212 of the base 200. The chilled air may pass from the front vent 465, through one or more air apertures 255, and into the crock 250. As non-limiting examples, the cooler 450 may be based upon mechanical refrigeration, magnetic refrigeration, thermoelectric refrigeration, or combinations thereof.

The controller 300 comprises one or more circuit boards 310, a processor 320, a memory 325, a touch sensitive display 350, a timer function 330, and a wireless transceiver 340. The controller 300 may comprise the processor 320 and the memory wherein the memory 325 contains instructions for causing the processor 320 to control the sequence and timing of the heater 400, the cooler 450, and the touch sensitive display 350.

The touch sensitive display 350 may be adapted to allow a user to monitor and control the operation of the invention 100.

The controller 300 may indicate an operational status of the invention 100 using the touch sensitive display 350. As non-limiting examples, the operational status may comprise a current time, a current temperature, a time at time, a time remaining, a next temperature, or a combination thereof. The controller 300 may be adapted to accept operational input from the user via the touch sensitive display 350. The operational input may change the operational status of the invention 100 either immediately or at some programmed time in the future. As a non-limiting example, the user may instruct the controller 300 via the touch sensitive display 350 to cool the food contained within the crock 250 to a temperature of 40 degrees F. for the next six hours and then heat the food at a temperature of 200 degrees F. for the next four hours. During that ten hour period, the controller 300 may display the operational status on the touch sensitive display 350.

The timer function 330 may comprise a timer chip located on the one or more circuit boards 310 and communicatively coupled to the processor 320 or the timer function 330 may comprise software running on the processor 320 that increments or decrements a counter on a regular basis. As a non-limiting example, the timer function 330 may be software on the processor 320 that counts interrupts derived from a 50 Hz or 60 Hz AC power input.

The controller 300 may communicate with an application program 380 running on a smart device 900 over a wireless communication link 345 via the wireless transceiver 340. The wireless transceiver 340 may be coupled to a wireless antenna to transmit and receive signals comprising the wireless communication link 345. The application program 380 and the controller 300 may cooperate to make any or all of the operational status and any or all of the operational inputs accessible from the application program 380 on the smart device 900.

The crock 250 may be a ceramic pot that holds the food while the food is being cooked by the one or more heating elements 410 in the base 200. The crock 250 may comprise an open top such that the food may be placed into the crock 250. The crock 250 may be the same shape as the base 200. The outside dimensions of the crock 250 may be smaller than inside dimensions of the base 200 such that the crock 250 fits within the open-top receptacle of the base 200. The crock 250 may comprise the one or more air apertures 255 located on the rear wall of the crock 250. The one or more air apertures 255 may allow the chilled air from the cooler 450 to flow into the crock 250. The crock 250 may comprise a lip 270 which extends outward from the top edge of the crock 250 and which is larger than the open-top receptacle of the base 200. The height of the crock 250 may be such that the bottom surface of the lip 270 rests on the top of the front wall 210, the rear wall 212, the left side wall 214, and the right side wall 216 of the base 200 when the bottom surface of the crock 250 is resting on the bottom 205 of the base 200.

The crock 250 may comprise a pair of crock handles 265 to aid in placing the crock 250 into the base 200 and lifting the crock 250 from the base 200.

The lid 280 may be a cover for the crock 250. The lid 280 may comprise a lid handle 290 for grasping the lid 280 during removal and replacement of the lid 280. In some embodiments, the lid 280 may comprise a vent aperture 285 to relieve pressure within the crock 250 and/or to allow the air to flow through the crock 250.

In use, the food is placed into the crock 250 and the lid 280 is placed onto the crock 250. The crock 250 may be lowered into the base 200 and the power cord 235 coming from the base may be plugged into the wall outlet. The controller 300 may be instructed to cool and/or heat the crock 250 according to a specific temperature profile by using the touch sensitive display 350 on the front of the base 200 or by using the application program 380 running on the smart device 900. The controller 300 may operate the cooler 450 and/or the heater 400 to achieve the specific temperature profile. As a non-limiting example, the specific temperature profile may include a cooling period to deter growth of bacteria on the uncooked food followed by a heating period to cook the food.

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" refers to top and "lower" refers to the bottom. As a non-limiting example, the upper end of a vertical shaft is the top end of the vertical shaft.

As used in this disclosure, "AC" is an acronym for alternating current.

As used in this disclosure, an "aperture" is an opening in a surface. Aperture may be synonymous with hole, slit, crack, gap, slot, or opening.

As used in this disclosure, an "appliance" is an externally powered device or instrument intended for household use.

As used in this disclosure, an "application" or "app" is software that is specifically designed for use with a personal computing device.

As used herein, the words "control" or "controls" are intended to include any device which can cause the completion or interruption of an electrical circuit; non-limiting examples of controls include toggle switches, rocker switches, push button switches, rotary switches, electromechanical relays, solid state relays, touch sensitive interfaces and combinations thereof whether they are normally open, normally closed, momentary contact, latching contact, single pole, multi-pole, single throw, or multi-throw.

As used herein, the words "couple", "couples", "coupled" or "coupling", refer to connecting, either directly or indirectly, and does not necessarily imply a mechanical connection.

As used herein, "crock" refers to an earthenware pot or jar.

As used in this disclosure, a "display" is a surface upon which is presented an image, potentially including, but not limited to, graphic images and text, that is interpretable by an individual viewing the image. When used as a verb, "display" is defined as presenting such an image.

As used herein, "food" refers to any substance that people or animals eat or drink, or that plants absorb.

As used herein, "front" indicates the side of an object that is closest to a forward direction of travel under normal use of the object or the side or part of an object that normally presents itself to view or that is normally used first. "Rear" or "back' refers to the side that is opposite the front.

As used in this disclosure, a "handle" is an object by which a tool, object, or door is held or manipulated with the hand.

As used in this disclosure, a "lid" is a movable or removable cover that is placed on a hollow structure to contain and/or protect the contents within the hollow structure.

As used herein, "magnetic refrigeration" refers to refrigeration resulting from application of the magnetocaloric effect.

As used herein, "mechanical refrigeration" refers to refrigeration using a mechanical compressor to implement a cycle of evaporation and condensation of a refrigerant within a sealed system.

As used in this disclosure, an "outlet" is a device placed in the electrical wiring system of a building where electrical current can be taken to run electrical devices. In this disclosure, an outlet is a socket adapted to receive a plug. In some embodiments, an outlet may find use in a vehicle or on equipment. As non-limiting examples, outlets may be used on recreational vehicles and on generators.

As used herein, the terms "processor", "central processor", "central processing unit", "CPU", or "microprocessor" refer to a digital device that carries out the instructions comprising a computer program by performing basic arithmetic, logical, control, and input/out operations. The term "microprocessor" may additionally imply a level of miniaturization and power reduction that makes the device suitable for portable or battery operated systems.

As used herein, "smart device" refers to a portable electrical device comprising at least a processor, display, input device, and network connection. The input device is generally a touch screen, keyboard, or voice recognition. The network connection is generally wireless. Non-limiting examples of smart devices may include smartphones, tablets, personal digital assistants, laptop computers, and smartwatches.

As used herein, "thermoelectric refrigeration" refers to refrigeration resulting from the use of one or more thermoelectric coolers.

As used in this disclosure, a "transceiver" is a device that is used to transmit and/or receive signals. The signals may be audible, optical, or RF in nature.

As used in this disclosure, a "vent" is an opening in the structure that allows air to enter or escape.

As used in this disclosure, "wireless" is an adjective that is used to describe a communication channel that does not require the use of physical cabling.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A slow cooker with heating and cooling functions comprising:
   a base, a heater, a cooler, a controller, a crock, and a lid;
   wherein the slow cooker with heating and cooling functions is a cooking appliance that keeps food chilled using the cooler prior to cooking the food using the heater;
   wherein the base is a holder for the crock and an enclosure for the heater and the cooler;
   wherein the base comprises a front wall, a left side wall, a rear wall, and a right side wall that are coupled to each other and to a bottom to form an open-top receptacle that the crock is lowered into;
   wherein the base is made of a rigid, heat resistant material such that heating or cooling of the crock does not affect a countertop;
   wherein the base comprises a pair of base handles to aid in carrying the slow cooker with heating and cooling functions;
   wherein the pair of base handles is coupled to the left side wall and the right side wall;
   wherein the heater comprises one or more heating elements and one or more temperature sensors;
   wherein the one or more heating elements produce heat when an electrical current is passed through the one or more heating elements;
   wherein the one or more heating elements are controlled by the controller via one or more heating control signals;
   wherein the one or more temperature sensors monitor an actual temperature of the crock and report the actual temperature to the controller;

wherein the controller cycles power to the one or more heating elements on and off to maintain the actual temperature at a predetermined cooking temperature;

wherein the cooler produces chilled air when power is applied to the cooler;

wherein the cooler is controlled by the controller via one or more cooling control signals;

wherein the cooler pulls air in through a front vent, chill the air, and blow the chilled air out of a rear vent located in the rear wall of the base;

wherein the chilled air passes from the front vent, through one or more air apertures, and into the crock.

2. The slow cooker with heating and cooling functions according to claim 1 wherein the cooler is based upon mechanical refrigeration, magnetic refrigeration, thermoelectric refrigeration, or combinations thereof.

3. The slow cooker with heating and cooling functions according to claim 2 wherein the controller comprises one or more circuit boards, a processor, a memory, a touch sensitive display, a timer function, and a wireless transceiver;

wherein the controller comprises the processor and the memory wherein the memory contains instructions for causing the processor to control the sequence and timing of the heater, the cooler, and the touch sensitive display.

4. The slow cooker with heating and cooling functions according to claim 3 wherein the touch sensitive display is adapted to allow a user to monitor and control the operation of the slow cooker with heating and cooling functions;

wherein the controller indicates an operational status of the slow cooker with heating and cooling functions using the touch sensitive display.

5. The slow cooker with heating and cooling functions according to claim 4 wherein the operational status comprises a current time, a current temperature, a time remaining, a next temperature, or a combination thereof;

wherein the controller is adapted to accept operational input from the user via the touch sensitive display;

wherein the operational input changes the operational status of the slow cooker with heating and cooling functions either immediately or at some programmed time in the future.

6. The slow cooker with heating and cooling functions according to claim 5 wherein the timer function comprises a timer chip located on the one or more circuit boards and communicatively coupled to the processor or the timer function comprises software running on the processor that increments or decrements a counter on a regular basis.

7. The slow cooker with heating and cooling functions according to claim 6 wherein the controller communicates with an application program running on a smart device over a wireless communication link via the wireless transceiver;

wherein the wireless transceiver is coupled to a wireless antenna to transmit and receive signals comprising the wireless communication link;

wherein the application program and the controller cooperates to make any or all of the operational status and any or all of the operational inputs accessible from the application program on the smart device.

8. The slow cooker with heating and cooling functions according to claim 7 wherein the crock is a ceramic pot that holds the food while the food is being cooked by the one or more heating elements in the base;

wherein the crock comprises an open top such that the food is placed into the crock.

9. The slow cooker with heating and cooling functions according to claim 8 wherein the crock is the same shape as the base;

wherein the outside dimensions of the crock are smaller than inside dimensions of the base such that the crock fits within the open-top receptacle of the base.

10. The slow cooker with heating and cooling functions according to claim 9 wherein the crock comprises the one or more air apertures located on a rear wall of the crock;

wherein the one or more air apertures allow the chilled air from the cooler to flow into the crock.

11. The slow cooker with heating and cooling functions according to claim 10 wherein the crock comprises a lip which extends outward from the top edge of the crock and which is larger than the open-top receptacle of the base.

12. The slow cooker with heating and cooling functions according to claim 11 wherein the height of the crock is such that the bottom surface of the lip rests on the top of the front wall, the rear wall, the left side wall, and the right side wall of the base when the bottom surface of the crock is resting on the bottom of the base.

13. The slow cooker with heating and cooling functions according to claim 12 wherein the crock comprises a pair of crock handles to aid in placing the crock into the base and lifting the crock from the base.

14. The slow cooker with heating and cooling functions according to claim 13 wherein the lid is a cover for the crock;

wherein the lid comprises a lid handle for grasping the lid during removal and replacement of the lid.

15. The slow cooker with heating and cooling functions according to claim 14 wherein the lid comprises a vent aperture to relieve pressure within the crock and/or to allow the air to flow through the crock.

* * * * *